(12) United States Patent
Liu et al.

(10) Patent No.: US 8,806,970 B2
(45) Date of Patent: Aug. 19, 2014

(54) SEALING DEVICE FOR A DEVICE FOR MEASURING THE FILL LEVEL IN A FLUID CONTAINER

(75) Inventors: Yubo Liu, Muelheim (DE); Wilfried Harfst, Mainz (DE); Sacha Kaercher, Belfort (FR); Wolfgang Vogt, Kahl (DE)

(73) Assignee: Areva GmbH, Erlangen (DE)

( * ) Notice: Subject to any disclaimer, the term of this patent is extended or adjusted under 35 U.S.C. 154(b) by 392 days.

(21) Appl. No.: 13/262,700

(22) PCT Filed: Mar. 29, 2010

(86) PCT No.: PCT/EP2010/001965
§ 371 (c)(1),
(2), (4) Date: Dec. 21, 2011

(87) PCT Pub. No.: WO2010/112187
PCT Pub. Date: Oct. 7, 2010

(65) Prior Publication Data
US 2012/0090392 A1     Apr. 19, 2012

(30) Foreign Application Priority Data

Apr. 2, 2009   (DE) .......................... 10 2009 015 629

(51) Int. Cl.
*G01F 23/00*      (2006.01)
*G21C 13/028*    (2006.01)

(52) U.S. Cl.
USPC ............................. 73/866.5; 73/295; 376/203

(58) Field of Classification Search
USPC .................................. 73/295, 866.5; 376/203
See application file for complete search history.

(56) References Cited

U.S. PATENT DOCUMENTS

| | | | |
|---|---|---|---|
| 3,635,793 A * | 1/1972 | Kolb et al. | 376/364 |
| 3,769,156 A | 10/1973 | Brecy | |
| 3,889,989 A | 6/1975 | Legris | |
| 3,895,831 A * | 7/1975 | Fisher | 285/93 |
| 4,440,717 A | 4/1984 | Bevilacqua et al. | |
| 4,441,777 A * | 4/1984 | Harootion | 439/274 |
| 4,450,315 A * | 5/1984 | Waterman | 136/230 |
| 4,605,274 A * | 8/1986 | Ichikawa | 439/277 |
| 4,945,623 A * | 8/1990 | Porter | 29/402.07 |
| 4,986,954 A | 1/1991 | Feurgard | |
| 5,084,228 A | 1/1992 | Lhwillier | |
| 5,828,711 A * | 10/1998 | Malmasson | 376/204 |

(Continued)

FOREIGN PATENT DOCUMENTS

| | | |
|---|---|---|
| DE | 2 144 087 | 3/1973 |
| DE | 40 02 163 A1 | 7/1990 |

(Continued)

*Primary Examiner* — Hezron E Williams
*Assistant Examiner* — Alexander Mercado
(74) *Attorney, Agent, or Firm* — Laurence A. Greenberg; Werner H. Stemer; Ralph E. Locher

(57) ABSTRACT

A sealing device for a device for measuring a fill level in a fluid container, particularly in a pressure container of a nuclear facility, includes at least one thermocouple which is connected by a pressure pipe to the pressure container and a pipeline connected to the pressure pipe to an evaluation unit. The pressure pipe and the pipeline are connected to each other by a pipe screw connection including a central part having two threaded pieces. One threaded piece is connected by a screw connection to a pipe sleeve and the other threaded piece is connected by a further screw connection to the pressure pipe.

5 Claims, 2 Drawing Sheets

(56) References Cited

U.S. PATENT DOCUMENTS

| | | | |
|---|---|---|---|
| 5,835,546 A * | 11/1998 | Stapleton | 376/203 |
| 6,522,708 B1 * | 2/2003 | Martin et al. | 376/204 |
| 6,721,381 B2 * | 4/2004 | Martin et al. | 376/204 |
| 6,776,524 B2 * | 8/2004 | Park et al. | 374/179 |
| 6,857,776 B2 * | 2/2005 | Park | 374/179 |
| 2003/0063653 A1 * | 4/2003 | Park et al. | 374/179 |
| 2004/0114664 A1 * | 6/2004 | Park | 374/179 |
| 2004/0255666 A1 * | 12/2004 | Park | 73/204.24 |
| 2008/0025372 A1 * | 1/2008 | Culbertson et al. | 374/185 |
| 2008/0130817 A1 | 6/2008 | Tashiro et al. | |

FOREIGN PATENT DOCUMENTS

| | | |
|---|---|---|
| DE | 195 41 622 A1 | 2/1997 |
| FR | 2 483 671 A | 12/1981 |
| JP | 57158522 A | 9/1982 |
| JP | 08220284 A | 8/1996 |
| SU | 1515063 A1 | 10/1989 |
| WO | 0135421 A1 | 5/2001 |
| WO | 2006037668 A1 | 4/2006 |

* cited by examiner

SEALING DEVICE FOR A DEVICE FOR MEASURING THE FILL LEVEL IN A FLUID CONTAINER

BACKGROUND OF THE INVENTION

FIELD OF THE INVENTION

The invention relates to a sealing device for a device for measuring the fill level in a fluid container, in particular in a pressure container of a nuclear facility, said device having at least one thermocouple.

Measuring devices or fill level probes where the fill level in a fluid container is indicated by way of the thermo-electric voltage generated by a heated thermocouple, are used in nuclear power stations, in particular, as they are comparatively insensitive to radioactive radiation compared to measuring devices based on other measuring principles and consequently are also able to operate in a reliable manner even in the event of an incident, possibly with elevated radiation levels. These types of measuring devices are used in particular in the reactor pressure vessel of a pressurized water reactor in order to monitor, at this location, the liquid level of the coolant flowing through the primary circuit of the power station above the fuel elements.

The measuring principle utilizes the different thermal transmission characteristics which occur during the transmission of heat from a heating element to a liquid coolant surrounding the heating element, on the one hand, and to a gaseous and vaporous medium on the other hand. As long as the heating element is surrounded by liquid coolant, the heat it generates is quickly removed such that even in its direct surrounding area, the temperature is only insignificantly above that ambient temperature that would be there if there were no heating. If, for example, during regular reactor operation or even during an incident in the reactor, the situation occurs where, as a condition of the operation or due to a pressure loss in the primary circuit, the liquid level in the reactor pressure vessel drops below the level of the heating element, said heating element therefore being surrounded by vaporous coolant, the heat transmission characteristics then deteriorate. The result of this is that the temperature in the surrounding area of the heating element increases, which can be proved by a thermometer or a temperature sensor mounted adjacent to the heating element. As a rule, thermocouples which supply a thermo-electric voltage that is substantially proportional to the temperature are used as temperature sensors on account of their reliable and robust method of operation.

The thermocouples used in this case are surrounded by jackets which include mineral materials and have to be connected to each other, possibly even releasably connected at least at one point in the containment structure or containment by means of a sealing device in order to meet the desired operating conditions. A connection of this type must meet the requirements of the LOCA standard (loss of coolant accident) and must nevertheless be easy to release. In nuclear technology LOCA refers to an accident where, due to a leak, coolant escapes from the coolant circuit of the nuclear reactor. As a rule, an accident with a large coolant loss is the basis for the design of the after-heat removal and emergency cooling systems as well as of the containment structure of a nuclear reactor. In this case, the total rupturing of a main coolant line is supposed. This accident is referred to as the "maximum hypothetical accident" (mha) which must never occur.

In modern nuclear power stations there are four safety levels: The first level corresponds to the normal operation of the power station. Incidents should be avoided as far as possible here. Nevertheless, it is supposed that incidents do occur. In the second level, "abnormal operation", the objective pursued is to contain said incidents and to prevent them developing into accidents. In this case too, it is supposed systematically that this objective is not achieved and in the third level, the incident control level, incidents are picked up where possible by very reliable inherent safety systems. Here too, failure is systematically supposed and in the fourth level attempts are made using "system-internal emergency protection measures" to limit the effects of the accident as much as possible to the system itself and not to make drastic measures in the surrounding area necessary (in particular evacuation). Fill level measuring should operate reliably in particular under extreme operating conditions in order to be able to take effective measures to protect the system and the surrounding area.

BRIEF SUMMARY OF THE INVENTION

Consequently, it is the object of the invention to realize a sealing device for a device for measuring the fill level in a fluid container, in particular in a reactor container, in such a manner that a perfect, pressurized water-tight connection is created between a pressure pipe and a pipeline connected thereto for accommodating a thermocouple and the reactor without damaging the thermocouple and/or the jacket thereof.

This object is achieved as claimed in the invention by a sealing device for a device for measuring the fill level in a fluid container, in particular in a pressure container of a nuclear facility, said device having at least one thermocouple which is connected to the pressure container with the aid of a pressure pipe and to an evaluation unit by means of a pipeline that is connected to the pressure pipe, the pressure pipe and the pipeline being connected to each other by means of a pipe screw connection which includes a central part with two threaded pieces, the one threaded piece being connected to a pipe sleeve with the aid of a screw connection and the other threaded piece being connected to the pressure pipe with the aid of a further screw connection.

The invention proceeds from the consideration that a sealing device should be created such that it corresponds not only to the requirements on all safety levels, but also remains operable in the event of a maximum hypothetical accident (mha). The sealing device should also be created such that even when connecting parts or cable coverings which include mineral materials are used, no damage is caused to the individual parts, in particular to the cable coverings of the thermocouple. In particular, vibrations and shocks of the components surrounding a sealing device are passed on directly to the cable where there is a direct connection between sealing device and mineral material cable. This means that the thermocouple can be damaged and consequently a reliable fill level indicator lost. In order to guarantee a reliable fill level indicator even in extreme operating situations, the thermocouple should be protected from such damage.

As has been now been realized, this type of protection of the thermocouple can be achieved by the thermocouple being surrounded in regions by a pipe sleeve and the sealing being effected on the pipe sleeve and not directly on the thermocouple. This means that oscillations of the sealing device are transmitted to the pipe sleeve and not directly to the thermocouple or to its jacket.

In addition, it is very important for a sealing device of this type to be constructed in a pressurized water-tight manner. The sealing device provides the primary pressure barrier between the pressure container and the inner region of the containment. A leak in the primary pressure barrier would result in the coolant fluid being transferred out of the pressure container through the line of the thermocouple to the assembly wall on the inside of the containment structure and there being a leak inside the containment structure as the assembly wall and the cable connections at this location are not designed for such conditions.

The pipe sleeve connected to the pipeline is preferably fixedly connected to the further pipe screw connection, the connection element being supported on the pipe sleeve. This creates a pressurized water-tight connection between the pipeline and the pressure region in the reactor or the pressure pipe in a simple cost-efficient manner and avoids the sealing device or parts of the pipeline or of the jacket being damaged during assembly.

In a further advantageous development it is provided that two connection pieces are part of the tubular connection element with a threaded piece each, said connection pieces having differently sized inside diameters, the connection piece with the smaller inside diameter being pushed onto the end face end of the pipe sleeve and the connection piece with the larger inside diameter being pushed onto the end face end of the pressure pipe. As the connection element is provided with the two diametrically extending connection pieces which have a threaded part each, this produces just one component which can be manufactured cost-efficiently. In addition, storage costs can be reduced through the few components that are necessary for the sealing device.

As in the last case depicted, the two connection pieces with the threaded pieces are aligned coaxially to each other, the mounting of the sealing device is facilitated in a substantial manner as, as already mentioned, the sealing device can be managed with fewer loose parts. For the mounting of the sealing device, just the connection element or central part needs to be pushed onto the pipe sleeve with the already loosened pipe nuts and then tightened on the threaded pieces. This means that a pressurized water-tight connection can be created between the pipeline and the pressure pipe.

In an advantageous manner, one pipe nut each is screwed onto the two threaded pieces, said pipe nut in each case pressing a sealing element against the outer circumference of the pipe sleeve or of the pressure pipe. With the aid of the sealing element, which is realized in an advantageous manner as a pinch ring, a perfect, permanent connection, which is able to be released again, is created between the pipe sleeve or the pipeline and the pressure pipe. Normally, the sealing device provides a permanent connection between the pipeline and the pressure pipe. The two annular gaps serve as an expansion joint between the pressure pipe, the pipe sleeve and the thermocouple, in particular when the heat coefficients of said parts are different.

An annular gap is preferably formed between the inside diameter of the tubular pressure pipe and the outside diameter of the pipe sleeve and a further annular gap is formed between the outside diameter of the thermocouple and the inside diameter of the pipe sleeve, the further annular gap and the pipeline connected thereto being sealed with the aid of the soldered joint between the thermocouple, the pipe sleeve and the pipe screw connection. Length compensation can take place between pipe sleeve and pressure pipe if the pipe sleeve and the pressure pipe are formed from different materials and also if the thermal expansion coefficients differ.

The thermocouple and the pipe sleeve are preferably connected together in a mechanical manner by means of a soldered joint. Said soldered joint can be produced using known methods which are certified in the nuclear power station sector. This soldered joint ensures that the thermocouple cannot move freely in the pipe sleeve and cannot become damaged and that thermocouple and pipe sleeve cannot push against each other. The transmission of pressure of the screw connection in the transition region between pipe sleeve and pressure pipe onto the pipe sleeve preferably occurs in as small a region as possible of the soldered joint, as a result of which direct transmission of oscillations of the screw connection elements onto the pipe sleeve and further onto the thermocouple via the soldered joint is kept small. In the region of the screw connection on the pipeline side, the pipe sleeve should form an annular gap with the thermocouple guided in its interior in order to keep the transmission of oscillations, shocks and vibrations to the thermocouple as small as possible.

In addition, it is advantageous for two end pieces of the pipe sleeve and of the pressure pipe pushed one on top of the other to form an overlap region, the length of which is smaller than, equal to or greater than the outside diameter of the pipe sleeve.

A further advantage, in particular, is that the pipe sleeve is connected to the hose or pipeline with the aid of a further pipe screw connection, said hose or pipeline being realized in a substantially flexible manner.

It is also advantageous for the thermocouple accommodated in the hose or pipeline and the pressure pipe to be surrounded by a jacket which is formed at least in part from a mineral-insulating material In addition, it is advantageous for at least part of the pipeline and of the pressure pipe as well as the end pieces of the pipe sleeve and of the pressure pipe to be connected together by means of the sealing device and to be arranged on a central axis which extends in a straight line.

In a further advantageous development it is provided that at least parts of the pipeline and of the pressure pipe are supported in the containment structure of the reactor by means of one or more support elements. In this way, it is possible to avoid vibrations being transmitted to the pipelines and said pipelines becoming damaged. This also means that it is not possible for any electron transmission reaction (voltage series) to take place between the pipe parts which include different materials if pressure pipe and pipe sleeve consist of different materials, in particular precious metals.

To this end, it is advantageous for the end piece of the pipe sleeve to be accommodated in a tubular, cylindrical interior space at the end of the pressure pipe, the interior space being delimited by a radially extending bottom, to which is connected a cylindrical opening with a smaller diameter through which the thermocouple is guided, an end face of the end piece of the pipe sleeve being arranged at a spacing to the cylindrical opening.

In an advantageous further development it is provided that for accommodating the thermocouple and/or the sealing device, the pressure pipe is surrounded by a pressure-guiding encapsulation, in particular by a pressure housing, which is surrounded at least in part by an insulating body, which consists at least in part of mineral materials and is connected to the pressure container of the reactor or is assigned to the same.

BRIEF DESCRIPTION OF THE SEVERAL VIEWS OF THE DRAWING

An exemplary embodiment of the invention is explained below by way of a drawing, in which, in more detail.

DESCRIPTION OF THE INVENTION

Identical parts are provided with the same references in all the figures.

Figure 1:
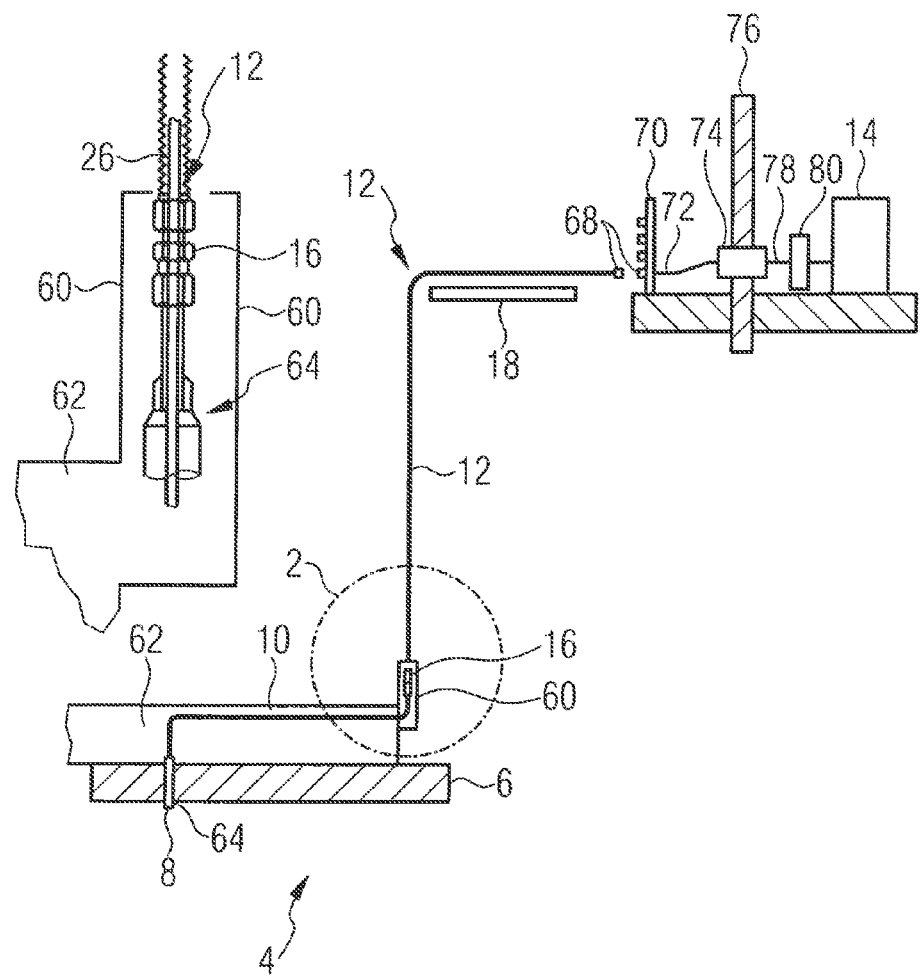
FIG. 1 shows, in the manner of a cutout, a schematic representation of a nuclear facility with a pressure container and a containment, a sealing device in the region of the heat-insulating layer in the upper region of the pressure container with a thermocouple guided into the pressure container and with an evaluation unit arranged outside the containment, a part section, enlarged representation of the sealing device also being shown.
Figure 2:
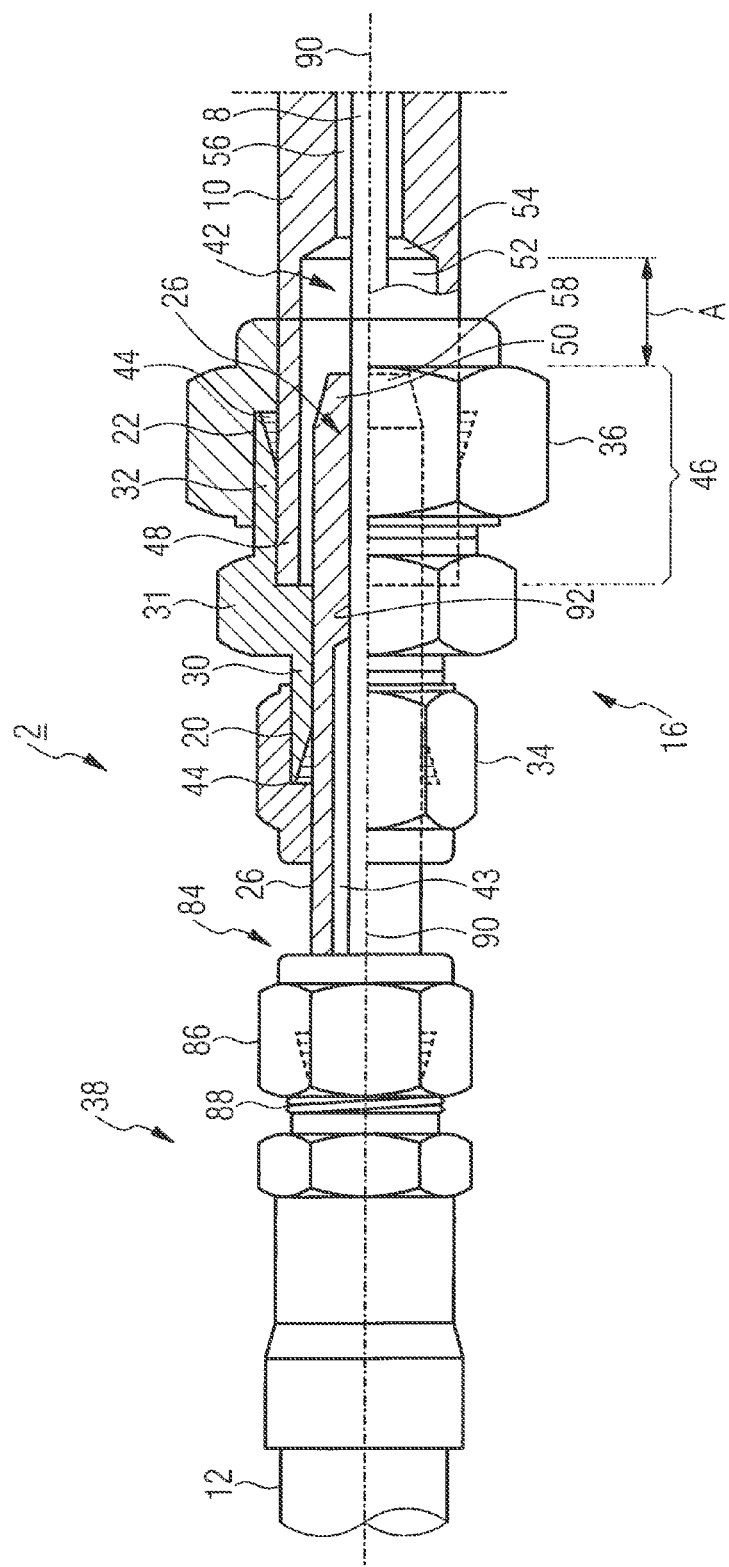
FIG. 2 shows an enlarged view of the sealing device in FIG. 1 in cross section.

A sealing device 2, shown in side view and part section in FIG. 1 and in cross section in FIG. 2, is used to guide a thermocouple 8 for a device 4 for measuring the fill level in a fluid container, said device monitoring the level of the coolant in a reactor pressure container. In the exemplary embodiment in FIG. 1, the reactor pressure container is indicated by the reference numeral 6. The reactor pressure container 6 is surrounded by containment, also called a containment structure. The containment structure serves in normal operation, above all however in the event of accidents, to protect the surrounding area of the facility against damage. The containment structure is illustrated in FIG. 1 by a wall 76. The remaining parts of the reactor facility are not shown for reasons of clarity.

Usually, a multitude of heated thermocouples are arranged for the most part at regular spacings from each other on a rod-shaped or tubular carrier or on an elongated measuring tube, which dips into the fluid to be monitored with regard to its level and in the interior of which the necessary power and signal lines are also guided for supplying power to the heating elements and transmitting signals to an external evaluation unit. The sensors or measuring positions arranged at different levels consequently enable a digital, spatially discrete indication of the fill level in the container, the (local) resolution being dependent on the number of thermal sensors per level section. A measuring device of this type is known, for example, from RU 2153712 C1. Apart from the heated thermocouples that are effective as primary signal generators, in this case, a multitude of unheated thermocouples are also arranged in the interior of the measuring tube supplying a reference signal assigned to the respective primary signal. In this way, when the temperature information is being evaluated and, derived therefrom, the fill level determined, a time variation of the fluid or ambient temperature can also be taken into consideration. Without this type of measure, an increase or drop in the fluid temperature, for example, could be wrongly indicated as a variation in the fill level or an actual change in the fill level could be "hidden" by a simultaneous change in the temperature of the fluid. Just one thermocouple 8 of the mentioned measuring device or fill level probe is explained in more detail in the exemplary embodiment in FIG. 1 and FIG. 2.

The thermocouple 8 is connected to the pressure container wall of the reactor pressure container 6 with the aid of a pressure pipe 10 by means of the sealing device 2 and a further pipe screw connection 38 and is guided through the pressure container wall by means of a bushing 64.

As can be seen in FIG. 1, an insulating body 62 is provided on the pressure container wall 6 of the reactor container, said insulating body surrounding the pressure pipe 10. A pressure housing 60 is assigned to the insulating body 62 or is fastened on an outer side of the insulating or body 62. The pressure housing 60 surrounds a pipe screw connection 16 which is illustrated in an enlarged manner in FIG. 2. The pressure housing 60 is not shown in FIG. 2 to represent the sealing device 2, in particular the pipe screw connection 16 in a clearer manner.

With the aid of the pipe screw connection 16, the pressure pipe 10 is connected to a pipeline 12, which is supported in the containment structure or containment by one or more supporting elements 18 in such a manner that no oscillations or shocks are transmitted to the pipeline 12, the pressure pipe 10 and the connections 2 thereof and damage them in the event of an incident. The pipeline 12, the pressure pipe 10 and the connections 2 thereof have to be designed and placed in the containment structure such that they are still operable even in the event of an 'mha' and the thermocouple or thermocouples 8 is or are still able to make the necessary measurement results available to an evaluation unit 14.

In the embodiment in FIG. 2, the sealing device 2 is designed for the device 4 for measuring the fill level in a fluid container, in particular in the pressure container 6 of a reactor container of a nuclear facility. The sealing device 2 includes the pipe screw connection 16 and the further pipe screw connection 38.

The pipe screw connection 38 serves for connecting the pipeline 12 to a pipe sleeve 26 and the pipe screw connection 16 serves for connecting the pipe sleeve 26 to the pressure pipe 10. The thermocouple 8 is guided in the pipeline 12 and in the pressure pipe 10. The jacket or insulation of the thermocouple 8 includes mineral materials which are sealed with the aid of the pipe screw connection 38 and the pipe screw connection 16 as explained in more detail below.

The thermocouple 8 is guided in the pipeline 12 and in the pressure pipe 10 and is connected to an assembly wall 70 of the containment structure or of the containment 76 as in FIG. 1 with the aid of a plug and a coupling 68. The thermocouple 8 is connected to a compensating element 72 and from there by means of a bushing 74 through the containment structure or the containment 76 and a compensating cable 78 as well as a redistributing means 80 is connected to an evaluation unit 82 in which the measuring results are monitored.

The pipe sleeve 26 connected to the pipeline 12 with the aid of the pipe screw connection 38 is pushed into a bore 84 of a pipe nut 86 and is connected thereto. To this end, the pipe nut 86 is screwed onto a threaded part 88 of the pipe screw connection 38.

A connection element 31, also referred to below as a central part, is pushed onto the pipe sleeve 26 and is consequently supported on the pipe sleeve 26. The connection element or central part 31 includes two diametrically extending connection pieces 30, 32 which have a threaded piece each 20 or 22 and are aligned coaxially to a central axis 90, the one threaded piece 20 being connected in a pressurized water-tight manner to the pipe sleeve 26 with the aid of a screw connection 34 and the other threaded piece 22 being connected in a pressurized water-tight manner to the pressure pipe 10 with the aid of a further screw connection 36. The connection element 31 with the two connection pieces 30, 32 forms one part. A conically designed sealing element or a pinch ring 44, which is inserted in each case into a conical turned groove provided at the end of the threaded piece 20 or 22, and which, by tightening the pipe nut 34, 36, seals the pressure pipe 10 in a pressurized water-tight manner or seals it against the pressure in the reactor container and in addition against the pipeline 12, is used for perfect sealing. The pipe sleeve 26 and the pressure pipe 10 can be produced from a stainless steel.

The pressure pipe 10 and the pipe sleeve 26 have an end piece 48 or 50 each which are pushed one on top of the other and, as a result, form an overlap region 46, the length of which is smaller than, equal to or greater than the outside diameter of the pipe sleeve 26. There is no contact between the two end pieces 48, 50 in said overlap region 46.

The two connection pieces 30, 32 are a fixed component of the tubular connection element 31 with the corresponding threaded pieces 20, 22 which have differently sized inside diameters, the connection piece 30 with the smaller inside diameter being pushed onto the end side end of the pipe sleeve 26 and the connection element 32 with the larger inside diameter being pushed onto the end side end of the pressure pipe 10. An annular gap 42 is formed between the inside diameter of the tubular pressure pipe 10 and the outside diameter of the pipe sleeve 26 and a further annular gap 43 is formed between the outside diameter of the thermocouple 8 and the inside diameter of the pipe sleeve 26 such that the two end pieces 48, 50, as already mentioned, have no mutual contact. This means that where thermocouple 8 and pipe sleeve 26 and pressure pipe 10 expand differently, length compensation can take place. The two annular gaps serve as an expansion joint between the pressure pipe, the pipe sleeve and the thermocouple, in particular when the thermal coefficients of said parts are different. Vapor from the pressure chamber of the reactor, which is sealed in relation to the annular gap 43 and the pipeline 12 connected thereto with the aid of a soldered joint 92 between thermocouple 8, the front end piece 50 of the pipe sleeve 26 and the pipe screw connection 16, collects in the annular gap 42.

The soldered joint 92 also preferably serves to connect thermocouple 8 and pipe sleeve 26. The soldered joint can be produced using known methods which are used, for example, in the case of beam tubes and fill level sensors. The overlap region between connection element 31 and soldered joint 92 along the central axis 90 should be kept as small as possible in order to restrict direct transmission of oscillations, vibrations or shocks of the screw connection elements via the pipe sleeve 26 to the thermocouple 8. On the pipeline side, the annular gap 43 between pipe sleeve 26 and thermocouple 8 prevents damage to the thermocouple 8 caused by the sealing device 2 oscillating.

The pressure pipe 10, in particular the pipe sleeve 26, is realized in a rigid manner or is distortion-free to a certain degree. With the aid of the sealing device 2 a protective connection is created between the pipeline 12, the pressure pipe 10 and the thermocouple 8 such that the jacket of the thermocouple 8 which includes an insulating mineral material is not damaged.

To this end it is also advantageous for the end piece 50 of the pipe sleeve 26 to be accommodated in a tubular, cylindrical interior space 52 at the end of the pressure pipe 10, the interior space 52 being delimited by a radially extending bottom 54, to which a cylindrical opening 56 with a smaller diameter is connected, through which the thermocouple 8 is guided, an end face 58 of the end piece 50 of the pipe sleeve 26 being arranged at a distance A to the cylindrical opening 56.

List of References

2 Sealing device
4 Device for measuring the fill level
6 Pressure container wall of a reactor container, pressure container
8 Thermocouple
10 Pressure pipe
12 Pipeline
14 Evaluation unit
16 Pipe screw connection
18 Supporting element
20 Threaded piece
22 Threaded piece
26 Pipe sleeve
30 Connection piece
31 Connection element, central part
32 Connection piece
34 Pipe nut, screw connection
36 Pipe nut, screw connection
38 Pipe screw connection
42 Annular gap
43 Further annular gap
44 Sealing element, pinch ring
46 Overlap region
48 End piece
50 End piece
52 Interior space
54 Bottom
56 Opening
58 End face
60 Pressure housing
62 Insulating body
64 Bushing through the pressure container wall
68 Plug, coupling
70 Assembly wall for coupling
72 Compensating element
74 Bushing through a containment structure or a containment
76 Wall of the containment structure or of the containment
78 Compensating cable
80 Distributing means
82 Evaluation unit
84 Bore
86 Pipe nut
88 Threaded part
90 Central axis
92 Soldered joint
A Distance

The invention claimed is:

1. A device for measuring a fill level in a pressurized fluid container, the device comprising:
a pressure pipe guided out of the fluid container;
a thermocouple constructed as a mineral-insulated cable and disposed at least partly in said pressure pipe;
a pipe sleeve soldered in a partial section to said thermocouple and surrounding said thermocouple;
a sealing device being effective as a pressure barrier, said sealing device having a connection element with a central part encompassing said pipe sleeve and being supported on said pipe sleeve and a connection piece disposed at a first side, protruding laterally and encompassing said pressure pipe;
said connection element having a connection piece on a second side remote from said connection piece on the first side, said connection piece on the second side encompassing said pipe sleeve and abutting against said pipe sleeve in a contact region;
said pipe sleeve being spaced apart from said thermocouple in said contact region by an annular gap;
a screw connection connecting said connection piece on the first side to said pressure pipe; and
said pressure pipe being spaced apart from said pipe sleeve and from said thermocouple by an annular gap.

2. The device according to claim 1, wherein the fluid container is a reactor pressure container of a nuclear facility.

3. The device according to claim 1, wherein said connection piece on the first side has a threaded piece, and said screw connection has a pipe nut screwed onto said threaded piece and simultaneously pressing a sealing element against an outer periphery of said pressure pipe.

4. The device according to claim 1, which further comprises a screw connection connecting said connection piece on the second side to said pipe sleeve.

5. The device according to claim 4, wherein said connection piece on the second side has a threaded piece, and a pipe nut is screwed onto said threaded piece and simultaneously presses a sealing element against an outer periphery of said pipe sleeve.

* * * * *